April 14, 1925.
G. L. SHORT
ANIMAL RESTRAINING DEVICE
Filed Sept. 6, 1924
1,533,953
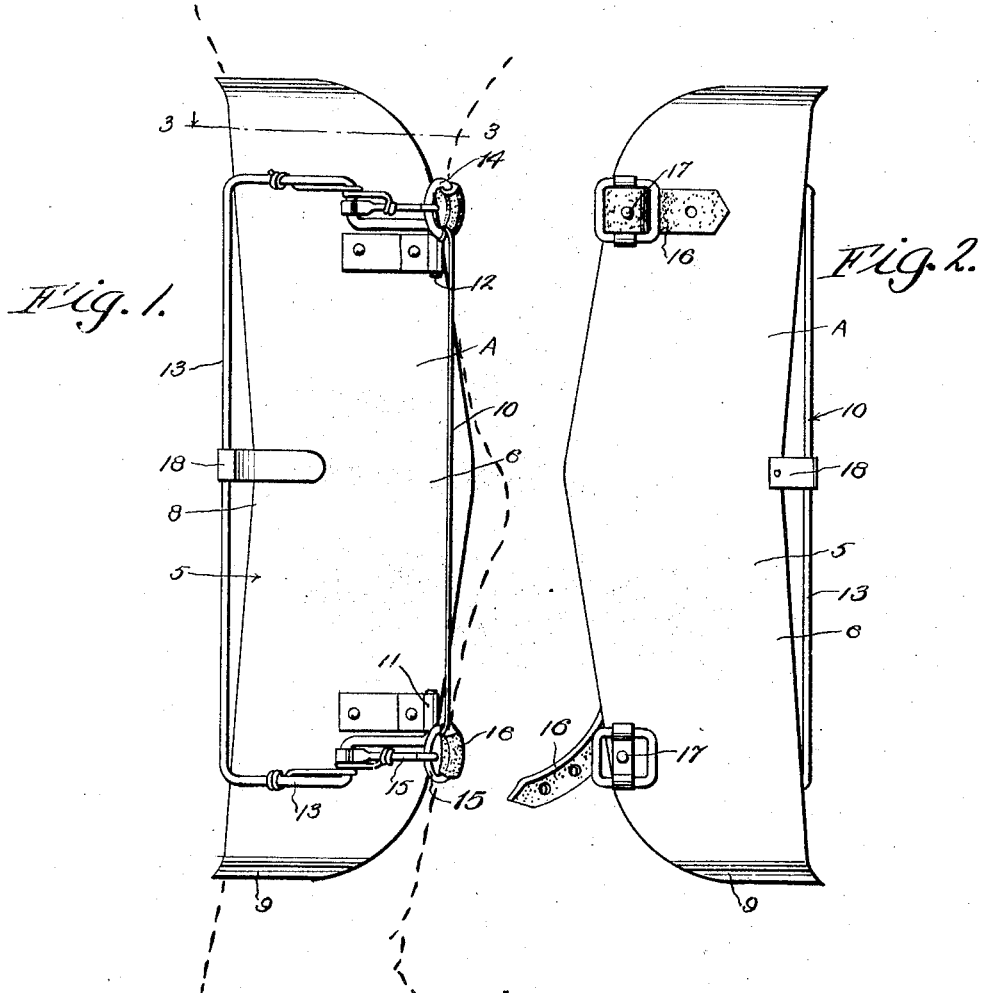

Patented Apr. 14, 1925.

1,533,953

UNITED STATES PATENT OFFICE.

GURNEY L. SHORT, OF ANGUS, MINNESOTA.

ANIMAL-RESTRAINING DEVICE.

Application filed September 6, 1924. Serial No. 736,331.

*To all whom it may concern:*

Be it known that I, GURNEY L. SHORT, a citizen of the United States, residing at Angus, in the county of Polk and State of Minnesota, have invented certain new and useful Improvements in Animal-Restraining Devices, of which the following is a specification.

This invention appertains to animal husbandry and the primary object of the invention is to provide a novel attachment for association with the leg of a cow to prevent the kicking of the animal during the milking process and the like.

Another object of the invention is to provide a novel device for breaking a cow of kicking during milking and the like, said device embodying a rigid guard plate for extending about the leg of a cow at the knee joint thereof and novel means for normally holding the plate in position against accidental displacement.

A still further object of the invention is to provide a novel animal restraining device of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings, in which drawings, Figure 1 is a side elevation of the improved device showing the same applied to the leg of a cow, Figure 2 is an elevation of the improved device showing the opposite side from that shown in Figure 1, Figure 3 is a transverse sectional view taken on the line 3—3 of Figure 1.

Referring to the drawings in detail, wherein similar reference characters designate corresponding parts throughout the several views the letter A generally indicates the improved device, which comprises a metal guard 5. This guard 5 is substantially U-shaped in cross section, as can be readily seen by referring to Figure 3 of the drawing. The metal guard 5 as shown includes parallel side walls 6 and an arcuate connecting front wall 7. The body or guard 5 is shaped to conform to the configuration of a cow's leg and is bowed inwardly toward the transverse center thereof as indicated by the reference character 8. The upper and lower terminals of the guard or body 5 is flarred outwardly to provide guard flanges 9 in order that the restraining device will not injure the leg of the cow.

The device is adapted to be placed on the cow's leg at the knee joint and is firmly held in place by fastening means 10 which will now be described.

The fastening means 10 includes hinge barrels 11 which are riveted to one of the side walls 6 adjacent to the opposite ends thereof as can be clearly seen by referring to Figure 1 of the drawing. These hinge barrels rockably receive the inwardly directed bearing arms 12 which are formed on the inner ends of the U-shaped swinging frame 13. The inner end of the swinging frame 13 carries spaced hooks 14 which are adapted to engage eyes 15 carried by straps 16 which are adapted to extend across the guard or body 5. The opposite ends of the straps 16 from the eyes are adjustably connected to the opposite wall 6 of the body 5 by suitable buckles 17 and in the use of the device the straps are initially adjusted by means of the buckles 17, after which the guard 5 is applied to the leg of the cow and the frame 13 is swung toward the free ends of the straps and the hooks 14 are placed in the eyes 15 after which the frame 13 is swung back against the guard. This will move the straps 17 in binding contact with the leg of the cow on opposite sides of the knee joint and thus firmly hold the guard in position. The guard holds the cow's leg rigid at the knee joint and thus effectively prevents the cow from kicking.

In order to hold the frame 13 in its adjusted position against accidental swinging movement a spring 18 is secured to the body 5 for engaging the said frame. This clip can be manually operated in order to release the frame when desired.

It has been found that after the restraining device has been used on the leg of a cow for several days, the cow will be entirely broken from kicking.

Changes as to details may be made without departing from the spirit or the scope of this invention, but:—

What I claim as new is:—

1. An animal restraining device comprising a rigid guard plate of a substantially U-shape in cross section arranged to partially encircle the leg of the animal at the joint thereof, straps arranged to extend across the open side of the guard plate above and below the joint, means adjustably connecting the straps to one side of the guard, and means carried by the other side of the guard for forcibly and synchronously bringing the straps into binding contact with the leg of the animal.

2. An animal restraining device comprising a rigid guard plate of a substantially U-shape in cross section adapted to partially embrace the leg of the animal at the joint thereof, said plate being bent to conform to the configuration of the animal's leg, a swinging U-shaped frame carried by one side of the guard plate, straps adjustably connected to the other side of the guard plate, eyes carried by the free ends of the straps, hooks carried by the swinging frame for engaging said eyes, and a spring clip for engaging the swinging frame for holding the same in an adjusted position.

3. As a new article of manufacture an animal restraining device comprising a rigid plate substantially U-shaped in cross section including side walls and a connecting front wall, buckles carried by one of the side walls, straps arranged on each side of the transverse center of the plate adjustably connected to the buckles, bearings carried by the other side wall of the plate, a swinging U-shaped frame including inwardly directed bearing arms fitting within the bearings, hooks carried by the frame, and eyes carried by the free terminals of the straps for engaging said hooks.

In testimony whereof I affix my signature in the presence of two witnesses.

GURNEY L. SHORT.

Witnesses:
 Roy D. West,
 H. F. Wickner.